(12) United States Patent
Palm et al.

(10) Patent No.: US 6,185,477 B1
(45) Date of Patent: Feb. 6, 2001

(54) SYSTEM FOR AUTOMATING THE CONTROL AND REGULATION OF MACHINES AND SYSTEMS IN THE PLASTICS INDUSTRY

(75) Inventors: Berthold Palm; Wolfgang Schovenberg, both of Köln (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/044,679

(22) Filed: Mar. 19, 1998

Related U.S. Application Data

(63) Continuation of application No. PCT/DE96/01667, filed on Sep. 5, 1996.

(30) Foreign Application Priority Data

Sep. 19, 1995 (DE) ................................. 195 34 768

(51) Int. Cl.[7] .............................. B29C 39/00; G05B 11/01
(52) U.S. Cl. ............................................ 700/197; 700/18
(58) Field of Search .................................. 700/18, 17, 86, 700/197, 200, 201

(56) References Cited

U.S. PATENT DOCUMENTS

| 5,062,052 | 10/1991 | Sparer et al. | |
|---|---|---|---|
| 5,177,420 | * 1/1993 | Wada et al. | 318/568 |
| 5,182,716 | * 1/1993 | Stroud et al. | 700/206 |
| 5,613,115 | * 3/1997 | Gihl et al. | 717/1 |
| 5,777,869 | * 7/1998 | Welch | 700/18 |

FOREIGN PATENT DOCUMENTS

| 0375487 | 6/1990 | (EP) . |
| 0603560 | 6/1994 | (EP) . |
| 2646536 | 11/1990 | (FR) . |
| 9311475 | 6/1993 | (WO) . |

OTHER PUBLICATIONS

T. Gerstner et al., "Rationelles Projektieren von Automatisierungssystemen," *ATP Automatisierungstechnische Praxis*, vol. 36, No. 12 (Dec. 1994), pp. 42–45.

* cited by examiner

Primary Examiner—Thomas C. Lee
Assistant Examiner—Nitin Patel
(74) Attorney, Agent, or Firm—Sughrue, Mion, Zinn, Macpeak & Seas, PLLC

(57) ABSTRACT

A system for automating the control and regulation of machines and systems in the plastics industry, in particular for blow molding machines, having programmable logic controllers (PLC), via which control and regulation functions of the machines and systems can be implemented as desired. The programmable logic controllers (PLC) have at least one operating and monitoring device and a local bus (user platform), and are further provided with digital technology blocks (10) which simulate individual electric circuit components and which can be used to implement the desired control and regulation functions in a modular fashion. The digital technology blocks (10) are connected to one another and to the user platform via data interfaces.

29 Claims, 2 Drawing Sheets

SYSTEM FOR AUTOMATING THE CONTROL AND REGULATION OF MACHINES AND SYSTEMS IN THE PLASTICS INDUSTRY

This is a Continuation of International Application PCT/DE96/01667, with an international filing date of Sep. 5, 1996, the disclosure of which is incorporated into this application by reference.

FIELD OF AND BACKGROUND OF THE INVENTION

The invention relates to new and useful improvements in an automation system for the control and regulation of machines and systems used e.g. in the plastics industry, in particular blow molding machines. More particularly, the invention relates to such automation systems having programmable logic controllers (PLC), which can be used to implement the open-loop and closed-loop control functions of the machines and systems as desired, and which have at least one operating and monitoring unit and a local bus (user platform). The programmable logic controllers (PLC) are provided with digital technology blocks which simulate electrical, application-specific switching details. These technology blocks are used to implement, in a modular fashion, the open-loop and closed-loop control functions that are necessary for a particular application. They can be connected to one another and to the user platform via data interfaces.

Plastics processing machines controlled by means of programmable logic controllers are known in the art. One representative such system is described in U.S. Pat. No. 5,062,052, the disclosure of which is incorporated herein by reference. In the past, it has been customary to use special hardware components, i.e. special assemblies, to automate machines in the plastics industry, in particular those for blow molding and injection molding. These known special assemblies have hardware and software which are specially designed for a specific, respective task. The results achieved with the plastics machines are good, but the control systems are highly complex. To cope with new or modified products, both the control programs and the special assemblies have to be adapted to the new machine conditions. Modifications sometimes also require new hardware components.

OBJECTS OF THE INVENTION

It is therefore an object of the invention to provide a system for automating the control and regulation of machines and systems in the plastics industry, which, in contrast to conventional systems, can easily adapt its control configuration and its scope of performance to the requirements of the specific task at hand without modifying the hardware or the basic software. Another aim is to enable the user to perform these adaptations without needing an in-depth knowledge of such systems, through the use of standardized modules, so-called basic modules.

SUMMARY OF THE INVENTION

These and other objects are achieved in that the technology blocks of the automation system are provided with organization modules. Some of these modules are for function modules which, in turn, have sub-modules in organization modules, these being, in particular, basic modules which can be used to perform the necessary basic steps for automation, for example PID regulating functions, analog-value sensing, etc. Additionally, some of these organization modules have organization blocks, for example for starting up machines, etc.

Designing the automation system in this way obviates the need for previously used, pluggable function modules, known, e.g., from EP 0 603 560 A1, the disclosure of which is hereby incorporated by reference. The complexity of the hardware is correspondingly lower and it is possible to use modular software throughout. This software considerably improves the planning and implementation of the open-loop control and closed-loop regulation of plastics-processing machines, especially linked ones. The solution according to the invention has a software structure which is particularly suitable for plastics-processing machines and which is not known from the general prior art of modular software engineering. his prior art is found, for example, in EP 0 375 487 A1 and FR 2 646 536, which describe general forms of automatic-machinery programs.

Function modules, which in turn have sub-modules, in particular basic modules with which the necessary basic steps of the automation can be carried out, for example PID control functions (Proportional, Integral, Differential, i.e., proportional plus floating plus derivative control), analog value sensing, etc., make it possible to implement all the necessary closed-loop and open-loop functions of plastics-processing machines in an interactive way.

Independent technology functions can be implemented in separate technology software blocks. Each technology block contains all the mechanisms and functions which are necessary for the application of the technology and the integration of the block into the control environment. For blow molding machines, the following technology blocks, among others, can be implemented:

temperature closed-loop control travel sensing wall thickness open-loop control with mandrel position closed-loop control closed-loop-controlled blow molding movement.

The setting of the wall thickness is particularly important for the wall thickness open-loop control and mandrel position closed-loop control of blow molding machines. Here, use is made of various function modules having specific basic modules which relate to specific sub-functions during blow molding.

In particular, the functions of the various function modules include, for example, input value treatment, scaling, etc. as well as further functions, for example, process control, profile calculation, nozzle setpoint value specification, open-loop control and closed-loop control of the ejection procedure, and tube length closed-loop control, which is carried out using a photoelectric cell. A function module is also used when a plurality of extruders interact, for example when processing different grades of material. The same applies to quality monitoring of the products, and also to liquid filling level closed-loop control, which is carried out in synchronization with the machine clock by means of the setpoint value specification of the respective extruder.

BRIEF DESCRIPTION OF THE DRAWINGS

The invention is explained in more detail below with the aid of diagrammatic, exemplary embodiments in the drawing, in which.

DETAILED DESCRIPTION OF THE PREFERRED EMBODIMENTS

Figure 2:
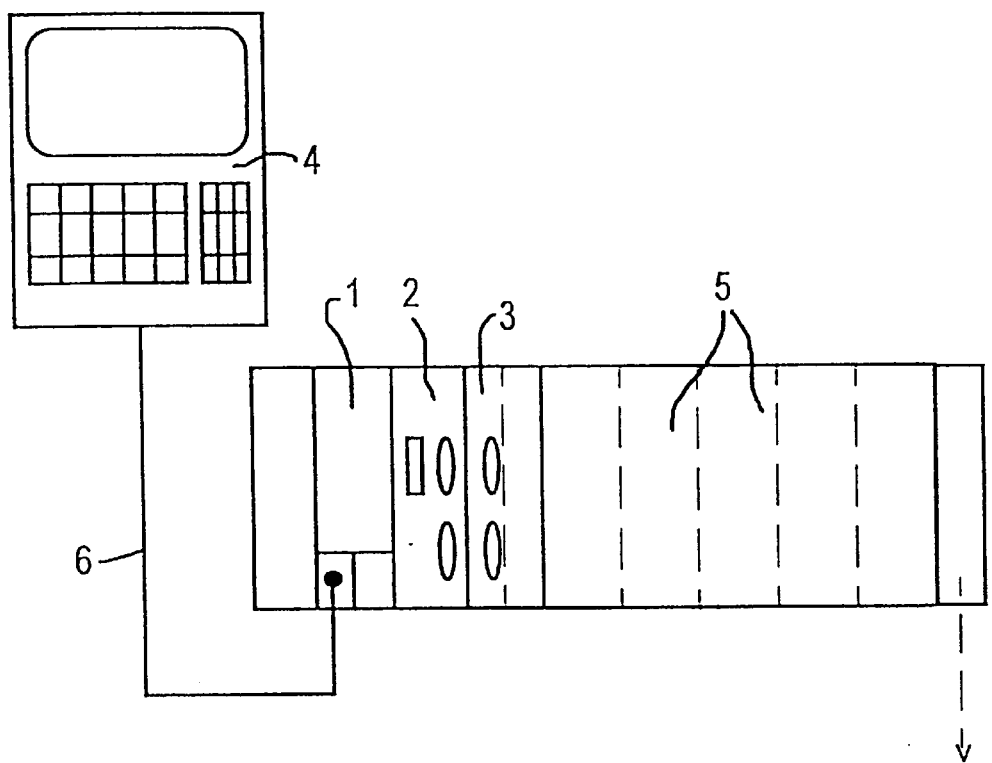
FIG. 2 shows a conventional automation system, various components of which are also utilized by an automation system according to the invention.

In FIG. 2, which shows a conventional system from which the operating and monitoring levels are taken, reference numeral 1 designates a programmable logic controller (PLC), for example a Siemens SIMATIC S5-115U, and 4 designates an operating and monitoring unit with screen and keyboard. The PLC 1 and the operating and monitoring unit 4, which are usually separate, are connected to one another by means of a data line 6. Both the technology assemblies 2 and 3, which interact with the PLC 1 and are replaced according to the invention, and the input and output assembly 5 are arranged in the direct vicinity of the PLC, for example in the same rack. All of these assemblies are preferably interconnected by means of a rear-mounted bus or the like, to enable them to communicate.

Figure 1:
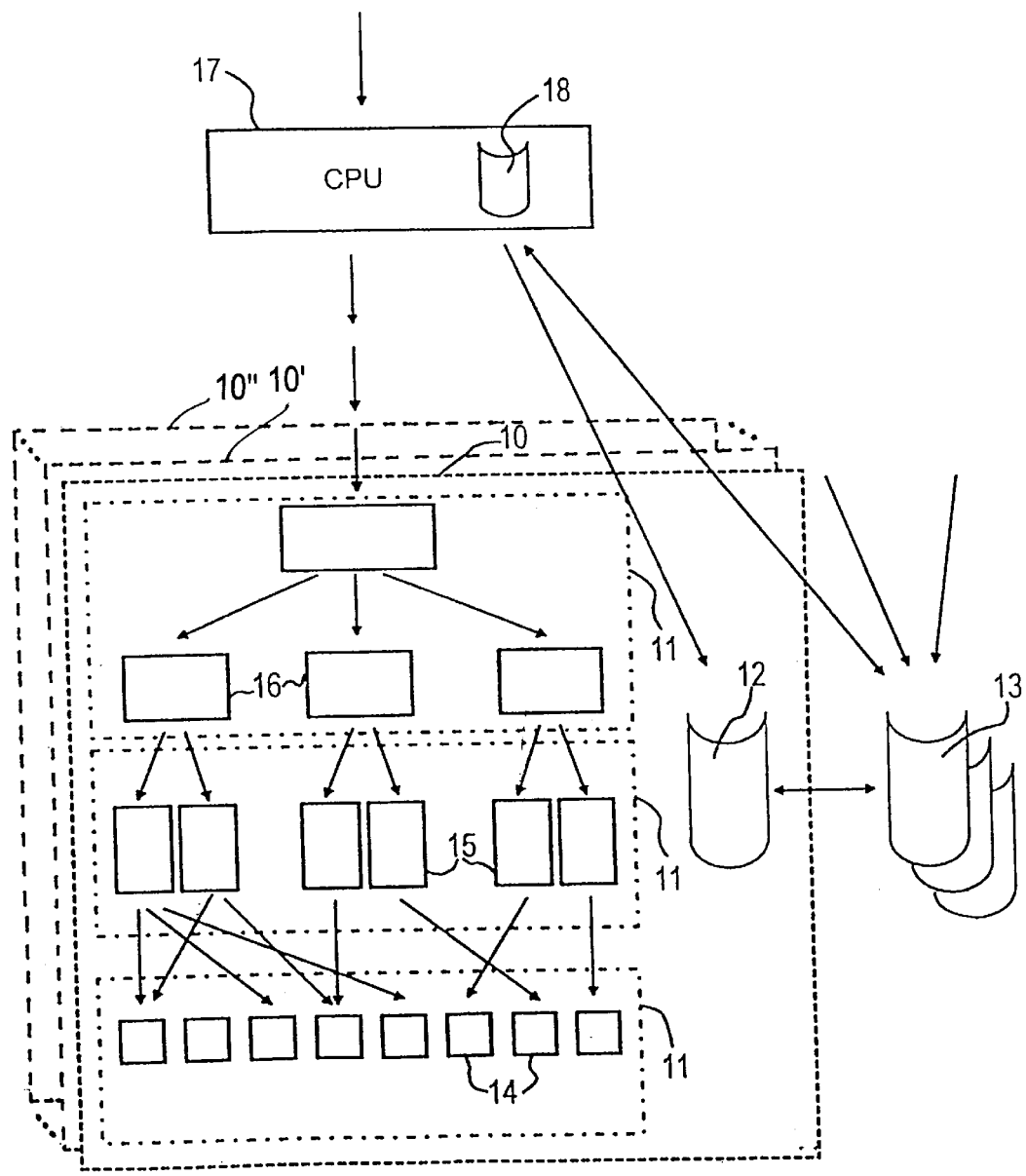
FIG. 1 shows the software structure of an automation system according to the invention.

FIG. 1 is a schematic view of the details of an automation system according to the invention and peripheral components. Reference numerals 10–10" designate various technology blocks with respective organization modules 11. The technology block 10 shown in detail is, for instance, directed to setting a wall thickness for a blow molding machine. The organization modules 11 are supplied with the data necessary for the production sequence from an internal data memory 12 in the technology block 10 and from external data memories 13. These data comprise orders, coordination data, addresses, parameters, actual values, curves, etc. Some of the organization modules 11, according to the invention, are connected to basic modules 14 (standard program blocks) and some organization modules 11 are connected to function modules 15, representative individual functions of which are described in greater detail below. Some of the organization modules 11 themselves contain organization blocks 16, for example for start-up of the machine, execution of cycles, etc., or reaction of the machine in response to an alarm. The technology blocks 10 are capable of running on the CPU platform 17, which is connected to the memory 18 for planning and design data. A preferred embodiment of a CPU suitable for use in the CPU platform 17 is the standard CPU of a Siemens SIMATIC S7-300 programmable logic controller.

As noted above, the function modules 15 make it possible to implement a wide range of control and regulation functions for plastic molding machines and the like. For instance, in the context of a technology block 10 for setting a wall thickness in a blow molding machine, function modules include, by way of example, any of the following, alone or in combination:

an input value function module 15 which can be used to process input values, adjust an offset and/or scale the input values;

a function module 15 which can be used to carry out processing control for a memory head operation;

a function module 15 according to which a wall thickness profile and ejection profile is calculated, e.g., on the basis of specified setpoint values with interpolation values;

a function module 15 for specifying nozzle setpoint values, and in which the current profile value can be logically linked to process engineering parameters such as basic gap, program selection, profile factor and dynamic round gap parameters;

a function module 15 for open-loop and/or closed-loop control of the ejection procedure, and for carrying our sliding position control;

a function module 15 which can be used to carry out a hose length closed-loop control, in particular by means of a photoelectric cell;

a function module 15 which can be used to carry out a liquid-filling-level closed-loop control, in particular in synchronization with a machine clock, by specifying setpoint values of the extruder;

a function module 15 with which an extruder open-loop control can be carried out, in particular for a plurality of extruders interacting in a cascade mode, whereby specifying setpoint values of the master extruder determines the rotational speed of the slave extruders; and a function module 15 for monitoring the quality (e.g. wall thickness) of the fabricated products, for example with reference to master curves with an adjustable tolerance band.

Data are exchanged between the technology functions and the communication files as well as, for example, with an operating and monitoring unit, a programming unit and the user programs in the PLC-CPU 17. This exchange of data takes place via data interfaces within the system. These data interfaces are not components of the technology blocks 10, but instead are advantageously made available and administered by the user platform. Access to the process peripherals within the user platform preferably proceeds directly from the technology blocks 10. The drivers necessary for this are therefore located here. On the other hand, feedback for the technology functions to the PLC-CPU 17 is advantageously provided via interrupt.

In summary, the CPU of a SIMATIC S7-300 is advantageously used as the basis for a comprehensive technological solution in which it is possible to run any modular technology blocks which together provide a complete open-loop and closed-loop control system to meet any desired technological requirements in plastics machines.

At the same time, both the functionality and the speed of the known, costly solutions with special assemblies are at least matched, in some cases even exceeded.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A system for automating open-loop control functions and closed-loop regulation functions of plastics-processing machines and systems, comprising:

a user platform comprising at least one input device, at least one monitor, and a local bus; and at least one programmable logic controller for implementing at least one of the control or regulation functions of the machines or systems, said programmable logic controller comprising:

digital technology blocks, which simulate application-specific electric circuit details and which are used to implement, in modular fashion as function modules, the control or regulation functions that are necessary for a specific application, said technology blocks being connected to one another and to said user platform via data interfaces, and said technology blocks comprising:

a plurality of organization modules, some of which are organization modules for the function modules, some of which are organization modules for sub-modules for the function modules, and some of which are organization modules for organization blocks of the function modules.

2. The system as claimed in claim 1, wherein the system automates open-loop control functions and closed-loop regulation functions of a blow molding machine.

3. The system as claimed in claim 1, wherein the sub-modules are basic modules for implementing necessary, rudimentary steps of the automated control and regulation functions.

4. The system as claimed in claim 3, wherein the sub-modules are basic modules for implementing PID closed-loop control functions or analog-value sensing.

5. The system as claimed in claim 1, wherein at least one of the organization blocks is for starting up the plastics-processing machine.

6. The system as claimed in claim 1, wherein one of said technology blocks comprises an input value function module for processing input values, adjusting an offset and scaling the input values.

7. The system as claimed in claim 6, wherein said one technology block is provided for setting a wall thickness for a blow molding machine.

8. The system as claimed in claim 1, wherein one of said technology blocks comprises a process control function module for implementing process control for a memory head operation.

9. The system as claimed in claim 8, wherein said one technology block is provided for setting a wall thickness for a blow molding machine.

10. The system as claimed in claim 1, wherein one of said technology blocks comprises a profile calculation function module for calculating a wall thickness profile and an ejection profile on the basis of specified setpoint values with interpolation values.

11. The system as claimed in claim 10, wherein said one technology block is provided for setting a wall thickness for a blow molding machine.

12. The system as claimed in claim 1, wherein one of said technology blocks comprises a nozzle setpoint value specification function module for specifying nozzle setpoint values.

13. The system as claimed in claim 12, wherein the nozzle setpoint value specification function module permits a current profile value to be logically linked to process engineering parameters for basic gap, program selection, profile factor and dynamic round gap.

14. The system as claimed in claim 12, wherein said one technology block is provided for setting a wall thickness for a blow molding machine.

15. The system as claimed in claim 1, wherein one of said technology blocks comprises a function module implementing a sliding position control for at least one of open-loop control and closed-loop regulation of an ejection procedure.

16. The system as claimed in claim 15, wherein said one technology block is provided for setting a wall thickness for a blow molding machine.

17. The system as claimed in claim 1, wherein one of said technology blocks comprises a function module for implementing a hose length closed-loop control.

18. The system as claimed in claim 17, wherein the hose length closed-loop control is implemented by means of a photoelectric cell.

19. The system as claimed in claim 17, wherein said one technology block is provided for setting a wall thickness for a blow molding machine.

20. The system as claimed in claim 1, wherein one of said technology blocks comprises a function module for implementing a liquid-filling level closed-loop control.

21. The system as claimed in claim 20, wherein the liquid-filling level closed-loop control is performed, in synchronism with a machine clock, by specifying setpoint values of an extruder.

22. The system as claimed in claim 20, wherein said one technology block is provided for setting a wall thickness for a blow molding machine.

23. The system as claimed in claim 1, wherein one of said technology blocks comprises a function module for implementing an extruder open-loop control.

24. The system as claimed in claim 23, wherein the extruder open-loop control controls a plurality of extruders interacting in a cascade mode, in such a manner that specifying setpoint values for the master extruder determines rotational speeds of the slave extruders.

25. The system as claimed in claim 23, wherein said one technology block is provided for setting a wall thickness for a blow molding machine.

26. The system as claimed in claim 1, wherein one of said technology blocks comprises a function module for monitoring quality of fabricated products.

27. The system as claimed in claim 26, wherein the quality monitoring function module monitors wall thicknesses of fabricated products.

28. The system as claimed in claim 26, wherein the quality monitoring function module monitors quality of fabricated products with reference to master curves with an adjustable tolerance band.

29. A system for a programmable logic controller, comprising:

digital technology blocks, which simulate application-specific electric circuit details and which are used to implement, in modular fashion as function modules, control or regulation functions for a specific application, said technology blocks comprising:
a plurality of organization modules, some of which are organization modules for the function modules, some of which are organization modules for sub-modules for the function modules, and some of which are organization modules for organization blocks associated with a plurality of the function modules.

* * * * *